United States Patent
Shaffer

(10) Patent No.: US 6,349,815 B1
(45) Date of Patent: Feb. 26, 2002

(54) IN-LINE STACKER MACHINE FOR STACKING COOKIES

(75) Inventor: Ricky L. Shaffer, Aurora, IL (US)

(73) Assignee: Peters Machinery Corporation, Chicago, IL (US)

( * ) Notice: Subject to any disclaimer, the term of this patent is extended or adjusted under 35 U.S.C. 154(b) by 0 days.

(21) Appl. No.: 09/503,790

(22) Filed: Feb. 14, 2000

(51) Int. Cl.[7] .............................................. B65G 47/30
(52) U.S. Cl. ................................................... 198/418.4
(58) Field of Search ..................................... 198/418.4

(56) References Cited

U.S. PATENT DOCUMENTS

| | | | |
|---|---|---|---|
| 2,324,930 A | 7/1943 | Joa | 226/14 |
| 4,307,800 A | 12/1981 | Joa | 198/374 |
| 4,413,462 A | 11/1983 | Rose | 53/540 |
| 4,646,908 A | 3/1987 | Gambetti | 198/422 |
| 4,759,433 A | 7/1988 | Kraft | 198/422 |
| 4,917,229 A * | 4/1990 | Korkowski | |
| 4,931,131 A * | 6/1990 | Thompson | |
| 4,936,077 A | 6/1990 | Langen et al. | 53/543 |
| 4,986,409 A * | 1/1991 | Alexander et al. | |
| 5,035,315 A | 7/1991 | Fukasaki et al. | 198/419.2 |
| 5,291,985 A | 3/1994 | Spatafora et al. | 198/419.2 |
| 5,341,913 A * | 8/1994 | Francioni | |
| 5,427,226 A | 6/1995 | Ueda et al. | 198/418.6 |
| 5,465,824 A * | 11/1995 | Van Maanen | |
| 5,529,167 A * | 6/1996 | Gabriele | |
| 5,779,432 A | 7/1998 | Pena | 414/794.4 |
| 5,865,106 A * | 2/1999 | van der Ent | |

* cited by examiner

*Primary Examiner*—Christopher P. Ellis
*Assistant Examiner*—Ken Bower
(74) *Attorney, Agent, or Firm*—Olson & Hierl, Ltd.

(57) ABSTRACT

The in-line stacker machine for stacking cookies has a frame with a stacking station, and a conveyor on the frame for receiving a line of cookies. A rotary platen mechanism carried on the frame cooperates with the conveyor and includes camming means for elevating alternate cookies from the conveyor onto a shelf spaced above the conveyor. Pusher mechanism is provided for moving a cookie on the conveyor and for moving the cookie on the shelf into substantial alignment with the cookie on the conveyor and then moving the cookies from the stacking station, with the cookies being stacked one on top of the other.

9 Claims, 2 Drawing Sheets

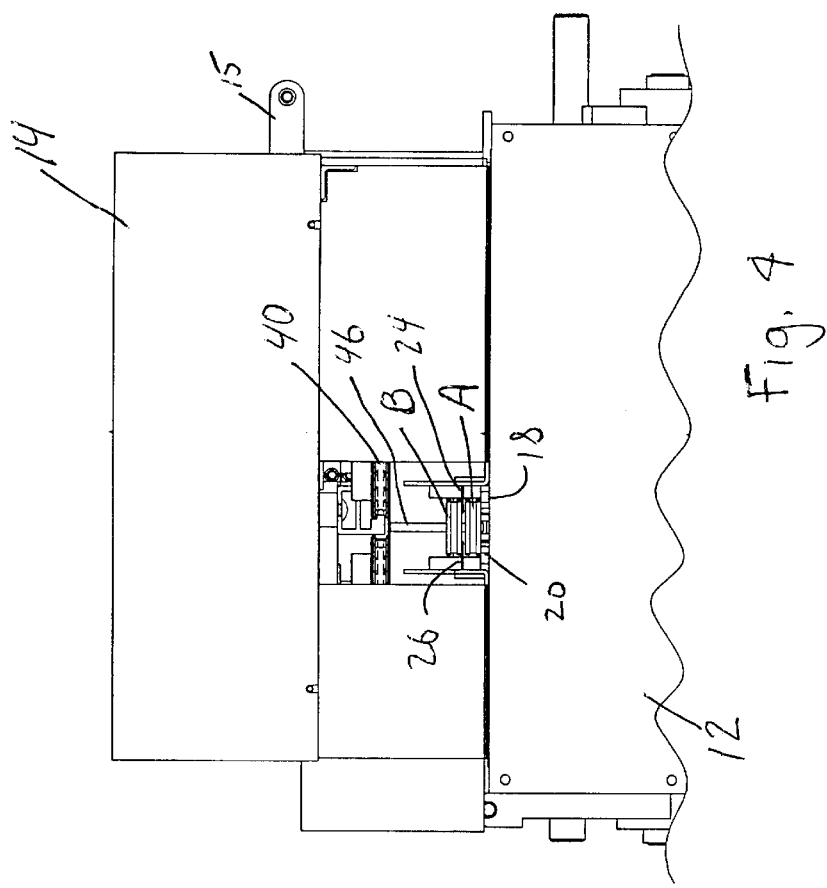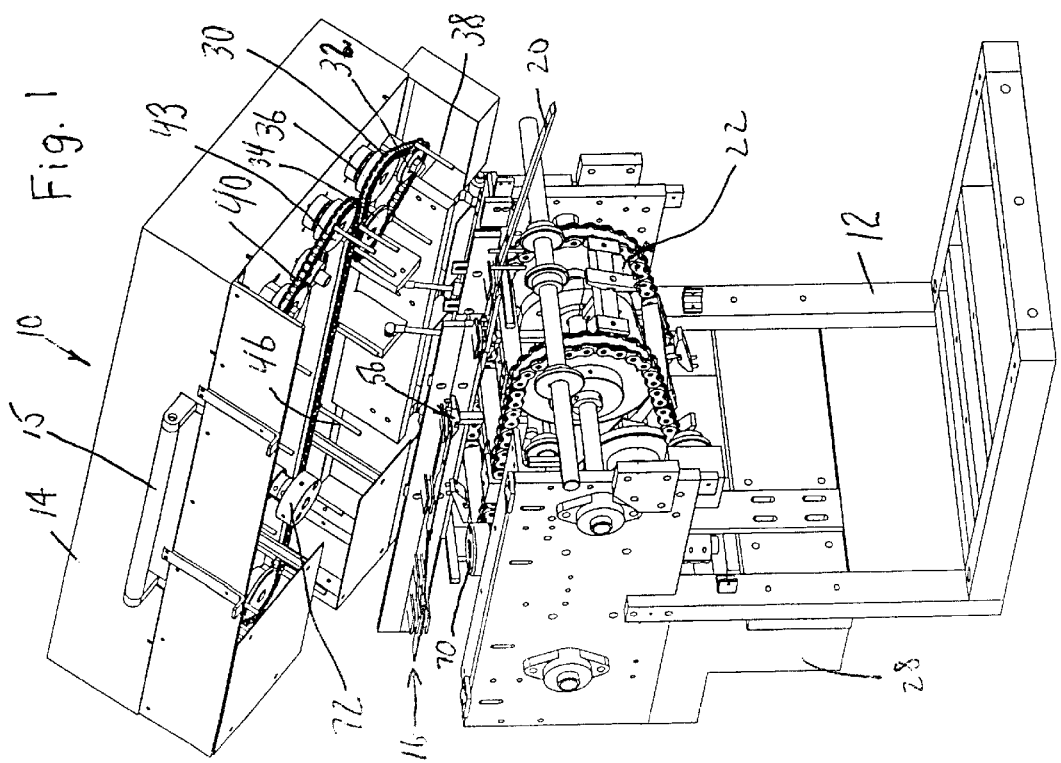

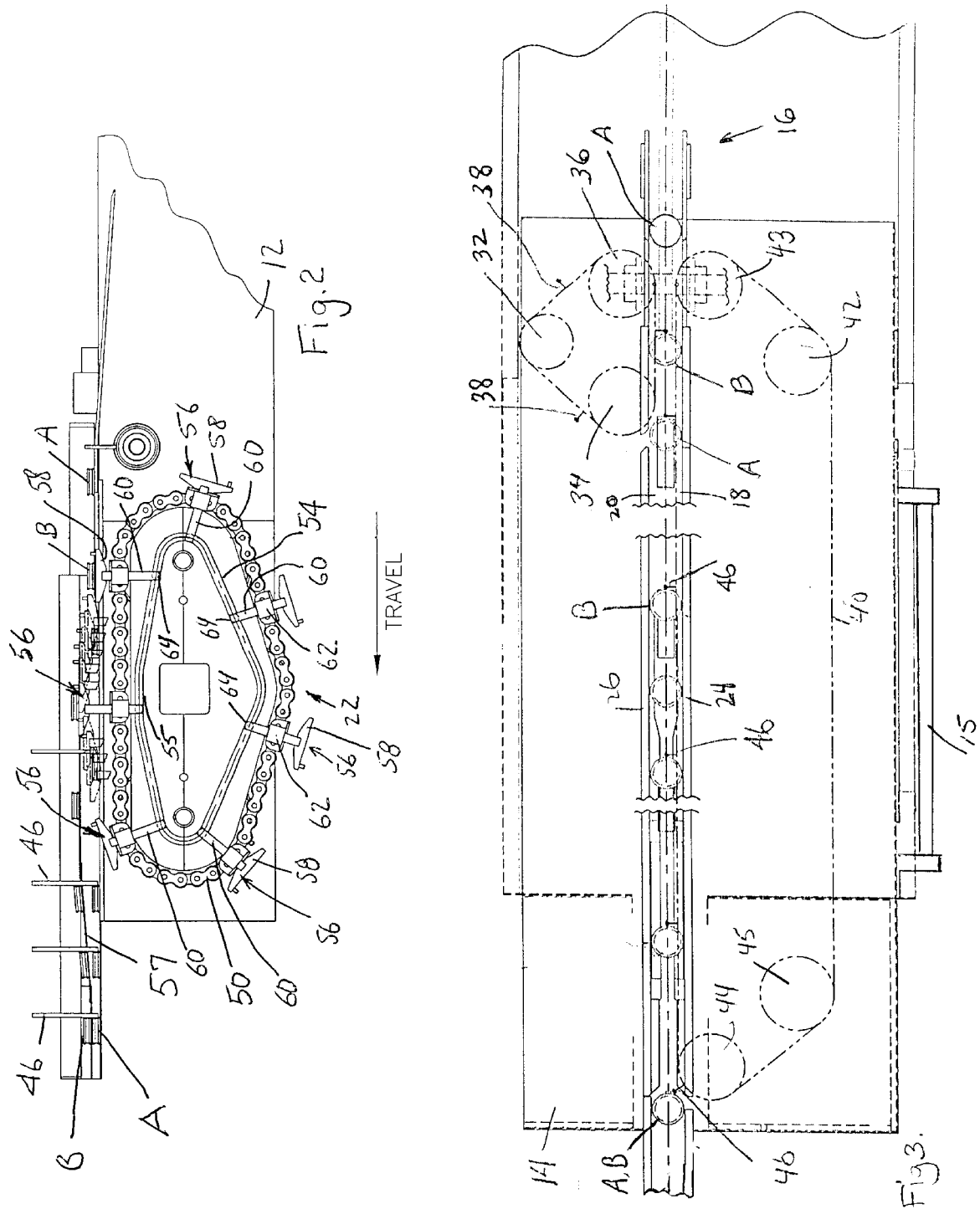

IN-LINE STACKER MACHINE FOR STACKING COOKIES

BACKGROUND OF THE INVENTION a. Field of the Invention

This invention pertains to an in-line stacker machine for stacking sandwich cookies, biscuits, or the like product two high as taken from a single feed line.

b. Discussion of the Prior Art

Packaging equipment has been provided for taking bakery items, such as, cookies, biscuits or the like from an oven and stacking them two or three high prior to wrapping them in a suitable film wrapper. It is desired that the stacking operation be continuous, at relatively high speed commensurate with the output from the oven and the capacity of the wrapping mechanism, and reliable without machine shut down or intermittent operation.

Rose U.S. Pat. No. 4,413,462 discloses apparatus for stacking sandwich cookies received from two conveyor troughs in side by side rows. A series of overhead conveyors cooperate with upwardly inclined and declining conveyor troughs for each row of sandwich cookies, elevating one row of sandwich cookies, and diverting them over a next adjacent row and lowering the one elevated row on top of the next adjacent row of sandwich cookies and moving the sandwich cookies out of the paths of the accelerating conveyor flights. The Rose U.S. Pat. No. 4,469,021 discloses a stacking machine for receiving input from two conveyor troughs, which functions well, but which is relatively complex and costly for single row operation.

In Kraft U.S. Pat. No. 4,759,433 there is shown an in-line cookie stacking apparatus comprising a supply conveyor that includes a first pair and a second pair of endless bands that are spaced laterally one from the other. Associated with the supply conveyor is an endless belt stacking conveyor. The stacking conveyor includes an ascending flight, a descending flight, and a return flight. The endless belt of the stacking conveyor is disposed between the sets of parallel bands comprising the supply conveyor. Affixed to the endless belt of the stacking conveyor are a series of cookie platens, which have different heights. The cookie platens are comprised of a series of hinged blocks. Positioned above and parallel to the horizontal flight is a dead plate, which comprises a pair of coplanar sheets. A discharge conveyor is associated with the descending flight of the stacking conveyor.

In operation, cookies arrive on the supply conveyor with a predetermined longitudinal spacing between adjacent cookies. As cookies are intercepted by the ascending flight of the stacking conveyor, alternate cookies will be engaged by the cookie platens while the remaining cookies continue to ride upon the in-feed endless bands. One cookie is elevated while the next cookie remains at a lower level on the endless bands. An arriving elevated cookie is deposited upon the spaced apart dead plate members, where it remains until the next pusher engages that cookie and moves it longitudinally until it is positioned over a cookie on the stacker conveyor. Then, the aligned cookies will be moved in unison to the end of the dead plate and fall onto the upper surface of the lower cookie.

While Kraft U.S. Pat. No. 4,759,433 reveals an in-line stacking machine, problems can arise with cleanliness and synchronization because of the possibility of crumbs etc. entering the spaces between the blocks which make up the platens.

SUMMARY OF THE INVENTION

An object of the present invention is to provide an improved in-line stacking machine that overcomes the disadvantages and deficiencies of prior art stacking machines.

Another object of the present invention is to provide an improved in-line stacking machine that incorporates a rotary cammed platen mechanism that cooperates with a cookie conveyor and a shelf for elevating alternate cookies from the cookie conveyor onto the shelf spaced above the conveyor and then stacking the cookies one on top of the other.

Other objects and advantages of the present invention will be made more apparent hereinafter.

These objectives are obtained in the improved in-line stacker machine for stacking cookies from a single source, such as an oven. The in-line stacker machine of the present invention includes a frame having a stacking station, rotary platen mechanism cooperating with the cookie conveyor and including camming means for elevating alternate cookies from the cookie conveyor onto a shelf on the frame spaced above the cookie conveyor, and pusher means for moving the cookie on the shelf in substantial vertical alignment with the cookie on the conveyor and then moving the cookies from the stacking station, the cookies being stacked one on the top of the other.

BRIEF DESCRIPTION OF THE DRAWINGS

There is shown in the attached drawing a presently preferred embodiment of the present invention, wherein like numerals in the various views refer to like elements, and wherein:

FIG. 1 is a left front perspective view of an in-line cookie stacker machine embodying the present invention, with some parts broken away to better illustrate the construction and operation of the in line cookie stacker machine;

FIG. 2 is a detail rear elevation view of the in-line cookie stacker machine, illustrating the rotary platen mechanism and the stacking logic;

FIG. 3 is a detail plan view of the in-line stacker as seen in FIG. 1, illustrating the stacking logic; and FIG. 4 is a detail end view of the in-line stacking machine, illustrating a stack of cookies ready to be transferred to a wrapping machine.

DESCRIPTION OF THE PREFERRED EMBODIMENT

There is shown in FIG. 1 the in-line cookie stacker machine 10 of the present invention. The stacker 10 includes a base or frame 12 supporting the major components of the stacker 10 and a cover 14 pivoted to the base or frame 12. Handle 15 is secured to cover 14 to raise the cover 14 to the position shown in FIG. 1. The stacker machine 10 may be one component in a production line, which may include an oven for baking the cookies and feeding them to the stacker machine for stacking cookies one on top of another and then a wrapping machine for wrapping predetermined groups of stacked cookies, for example, two groups of two stacked cookies. As viewed in FIG. 1, the oven or source of cookies to be stacked would be located to the right of the stacker machine 10 and the wrapping machine would be located to the left of the stacker machine 10. The cookies are fed from the source in a single lane of cookies, which may be individual or which may be sandwiches comprised of two cookies with a fill in between two cookies. Neither the oven nor the wrapping machine are shown as they are not part of the present invention.

Carried on the main part of the frame 12 are a cookie conveyor 16 comprised of a pair of spaced apart rails 18, 20 for supporting cookies received from the cookie source. Mounted on the frame is a rotary cammed platen mechanism 22 for taking alternate cookies from the incoming line of cookies on the cookie conveyor 16 and elevating them onto a shelf comprised of a pair of spaced apart rails 24, 26. (See FIGS. 1 and 4). A suitable drive motor 28 is carried on the main frame 12 and operatively connected to the various driven components. The drive motor 28 may be an electric or a hydraulic motor or the like and may include step down gearing. If desired, separate drive motors suitably synchronized with one another can be used to drive the various driven components.

With reference to FIGS. 1 and 3, a short flight chain 30 is supported on gears 32, 34, and 36 rotatably carried on the cover 14. Supported on the chain 30 are pins 38, which are adapted to engage and move cookies through the stacker machine 10 on the rails 18, 20 and under the shelf 24, 26. The pins 38 are spaced on the chain 30 so as to engage every other cookie on the cookie conveyor. Also carried on the cover 14 is a long flight chain 40 which is trained over gears 42, 43, 44, 45 rotatably carried on the cover 14. Pusher pins 46 are secured to and depend from the endless chain 40 comprising the long flight chain. The pusher pins 46 are spaced on the endless chain 40 so as to engage every other cookie on the cookie conveyor 16.

With reference to FIG. 2, there is better illustrated the rotary platen mechanism 22 for elevating the cookies from the conveyor 16 to the shelf comprised of the rails 24, 26. The rotary platen mechanism 22 includes an endless chain 50 rotatably supported on a support frame 52 which has a cam track 54 therein. Affixed to the endless chain 50 are a plurality of platens 56 comprising a platen body 58 having a lifting bar 60 secured thereto. The lifting bar 60 is slidable inward and outward within a bearing support 62 affixed to the endless chain 50. Secured to the end of each lifting bar 60 is a cam follower 64, which is constructed and arranged to ride in the cam track 54.

The drive motor 28 (FIG. 1) is operatively connected to a rotary drive member 70 which is adapted to cooperate with the driven member 72 carried on the cover 14. When the cover 14 is raised from the main frame 12, as shown in FIG. 1, the drive member 70 is disengaged from the driven member 72 and the drive for the long flight chain 40 and the short flight chain 30 are not operative. This would be the case, for example, when the cover 14 is raised for cleaning or inspection of components of the main frame 12 visible and/or accessible only when the cover 14 is raised. When the cover 14 is closed, the driven member 72 is engaged with the drive member 70 and the long flight chain 40 and the short flight chain 30 will be operative when the stacker machine 10 is operating.

In operation, cookies are fed from a source, for example, an oven, to the cookie conveyor of the in-line stacking machine 10. The short chain flight pins 38 engage a cookie on the cookie conveyor and advance it to the left as viewed in FIG. 3. To facilitate explanation every other cookie will be labeled A and the in between cookies will be labeled B. The A cookies will be transferred to a platen 56 on the rotary cammed platen mechanism 22 and moved to the shelf 24, 26 to become the top cookie in the stack to be formed and the B cookies will remain on the cookie conveyor 16 and become the bottom cookie in the stack to be formed.

The short flight chain 30 will engage the cookies on the conveyor 16 and move them into the stacking station of the stacking machine 10. The first cookie A will pass through the stacker machine 10 on the lower rails 18, 20 and become the bottom cookie of the stack. The next cookie B will be transferred to a platen 56 on the platen mechanism 22, which will carry the cookie to the left as viewed in FIG. 2, as well as lift the cookie B for placement on the shelf comprised of the rails 24, 26. The platen 56 is attached to a lifting bar 60, which has a cam follower 64 on the end thereof. The cam follower 64 of each platen 56 rides in the cam track 54 for actuating the platens 56 during rotation of the endless chain 50.

As the cookie B and the platen 56 travel forward (to the left as viewed in FIG. 2), the cookie B on the platen 56 is raised as the platen 56 is moved following the profile of the cam track 54. At the point of maximum rise the cam track 54 has a dwell portion 55, which prohibits further motion in a vertical direction, but allows motion horizontally. The cookie B and the platen body 58 carrying the cookie B move horizontally and pass the shelf comprised of the rails 24, 26 that is slightly lower than the bottom of the cookie B. At this time, the dwell portion 55 in the cam track 54 ceases, lowering the cookie B and the platen body 56. As the cookie B and the platen body 58 begin to lower, the rails 24, 26 of the shelf prevent the cookie B from moving in a downward direction, but allows the platen body 58 to pass through the space between the rails 24, 26. Once the platen body 58 is fully below the shelf (rails 24, 26), the cookie B is no longer driven and comes to rest. The bottom of the cookie B is now at an elevation above the top of the cookie A. Cookie B is also at rest. Cookie A moves along the cookie conveyor 18, 20, as seen in FIG. 2. The shelf (rails 24, 26) has a downwardly inclined ramp portion 57 at the end thereof. The pusher pin 46 that moves the cookie A also engages the cookie B and drives or moves both of the cookies together. Cookie A is directly under the cookie B and in substantial vertical alignment therewith, but is separated by the shelf. As cookies A and B travel further the shelf ends and the cookies A and B are physically stacked one on top of the other (see FIG. 4). The pusher pin 46 continues to drive the stacked cookies A and B, eventually depositing the stack of cookies into a packaging or wrapping machine. It will be understood that the operation is continuous and automatic as long as the stacker machine 10 runs. Cookies are stacked continuously with minimum breakage of cookies and stoppage of the stacking machine 10 runs.

The present invention provides an in-line stacker machine that can be driven from a single motor, which can be an electric motor, a hydraulic motor or the like. The single drive motor can be operatively connected to the various driven chains for actuation of the various endless chains and other operating components of the stacker machine 10. The components that may come into contact with the cookies may be fabricated from stainless steel or from a suitable plastic that can be easily and thoroughly cleaned.

While I have shown a presently preferred embodiment of the present invention, it will be apparent to persons of ordinary skill in the art that the invention may be otherwise embodied within the scope of the following claims.

I claim:

1. An in-line stacker machine for stacking cookies comprising a frame having a stacking station, a conveyor on said frame for receiving a line of cookies, said conveyor comprising a pair of spaced apart rails for supporting cookies, a cover carried on said frame, a rotary platen mechanism on said frame comprising an endless chain having a plurality of spaced apart platens thereon cooperating with the conveyor and including camming means for cooperating with the platens and elevating alternate cookies from the conveyor onto a shelf spaced above the conveyor, pusher means on said cover for moving a cookie on the conveyor and for moving the cookie on the shelf into substantial alignment with the cookie on the conveyor then moving the cookies from the stacking station, the cookies being stacked one on top of the other.

2. An in-line stacker machine as in claim 1, wherein the pusher means comprises a rotary chain having pins depending therefrom above the cookie conveyor for operating between the spaced apart rails.

3. An in-line cookie stacker machine as in claim 2, wherein the pusher means comprises a long flight rotary chain and a short flight rotary chain, each rotary chain having pins depending therefrom for engaging a selected cookie in a synchronized manner and for moving same.

4. An in-line cookie stacker machine for stacking cookies comprising a frame having a stacking station, a conveyor for receiving a line of cookies, a rotary platen mechanism cooperating with the conveyor and including camming means for elevating alternate cookies from the conveyor onto a shelf spaced above the conveyor, pusher means for moving a cookie on the conveyor and for moving the cookie on the shelf into substantial alignment with the cookie on the conveyor and then moving the cookies from the stacking station, the cookies being stacked one on top of the other, wherein the rotary platen mechanism comprises an endless chain having a plurality of spaced apart platens thereon, the platens being movably carried on the endless chain, the platens engaging camming means for moving the platens progressively outwardly when the platens approach the cookie conveyor, the platens being spaced apart and constructed and arranged for a platen to engage alternate cookies during travel of the platen, the platen engaging a cookie and elevating it from a position on the cookie conveyor to a position on the shelf.

5. An in-line stacker machine as in claim 4, wherein the platen includes a body constructed and arranged to support a cookie, a lifting rod secured to the platen and journalled in the endless chain for movement inward and outward from the endless chain, and a cam follower on the lifting rod, said cam follower engaging the camming means, whereby, during rotation of the endless chain, the lifting rod for a platen will be urged progressively outwardly from the endless chain for raising a cookie and positioning same on the shelf.

6. An in-line stacker machine as in claim 5, wherein the camming means includes a cam track.

7. An in-line stacker machine as in claim 6, wherein the cam track has a dwell at the top thereof, whereby, at the dwell further rise of the cookie is precluded, however horizontal motion is permitted, whereby, the cookie and platen move horizontally and pass the shelf that is slightly lower than the bottom of the cookie, and when the dwell in the cam track ceases, the platen and the cookie thereon are lowered onto the shelf.

8. An in-line stacker machine as in claim 4, wherein the pusher means comprises a rotary chain having pins depending therefrom above the cookie conveyor.

9. An in-line cookie stacker machine as in claim 8, wherein the pusher means comprises a long flight rotary chain and a short flight rotary chain, each rotary chain having pins depending therefrom for engaging a selected cookie in a synchronized manner and for moving same.

* * * * *